Oct. 4, 1949.   A. CHAUMERLIAC   2,483,965
INDICATOR OF FLUID FLOW
Filed March 30, 1945   2 Sheets-Sheet 1
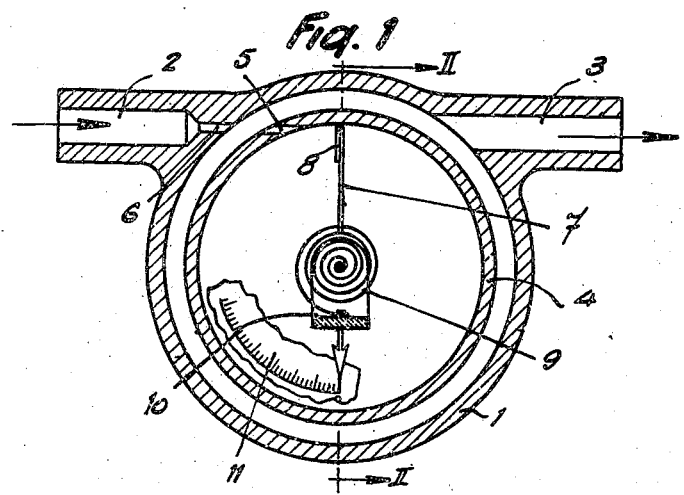
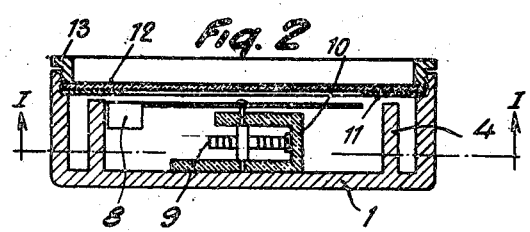
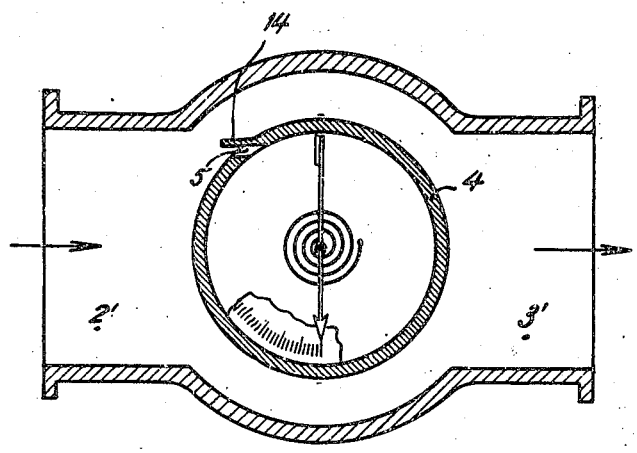
Inventor
André Chaumerliac
by Singer, Ehlert, Stern & Carlberg
Attorneys Oct. 4, 1949.   A. CHAUMERLIAC   2,483,965
INDICATOR OF FLUID FLOW
Filed March 30, 1945
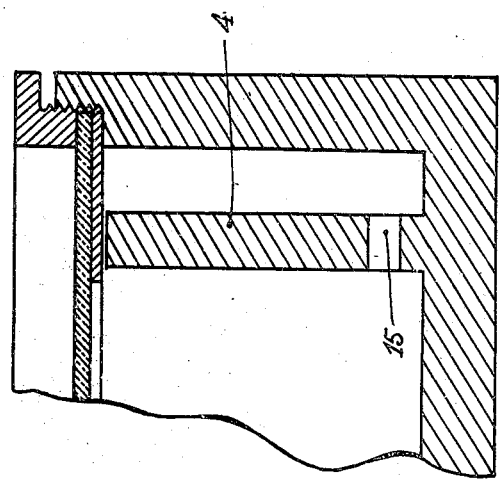
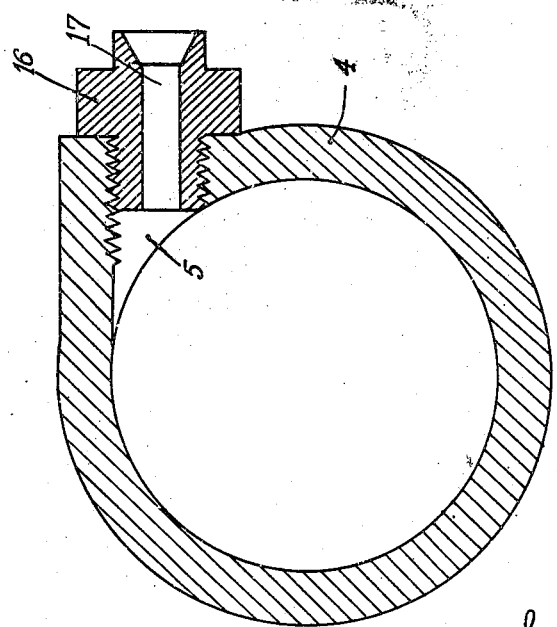
Inventor
André Chaumerliac
by Singer, Ehlert, Stern & Carlberg
Attorneys Patented Oct. 4, 1949

2,483,965

UNITED STATES PATENT OFFICE 2,483,965

INDICATOR OF FLUID FLOW

André Chaumerliac, Asnieres, France, assignor to Ernest Gauthier, Malakoff (Seine), France Application March 30, 1945, Serial No. 585,785
In France December 31, 1941

Section 1, Public Law 690, August 8, 1946
Patent expires December 31, 1961

7 Claims. (Cl. 73—228)

Indicating apparatuses for fluid flow are already known, in which apparatuses the fluid enters tangentially with reference to the side of the casing.

My invention refers to an apparatus of this type and its object is to simplify its construction and to improve its operation.

This novel indicator of fluid flow is chiefly characterized by the arrangement inside the casing of a drum in which is mounted the movable indicator system and which is in communication with the casing through an aperture lying very obliquely and almost tangentially with reference to the drum, the fluid passing out of the drum through spaces left free therefor or else through ports arranged at the periphery of the drum.

This novel indicator is furthermore characterized by the fact that the inlet and outlet nozzles of the casing may be arranged in alinement one with the other.

In accompanying drawings, I have shown diagrammatically and solely by way of example two forms of execution of the indicator in accordance with my invention.

Fig. 1 of said drawings is a horizontal cross-section of the indicating apparatus executed in accordance with my invention.

Fig. 2 is a cross-section along line II—II of Fig. 1.

Fig. 3 is a horizontal cross-section of a second form of execution of my invention.

Fig. 4 is a horizontal cross-section of the drum of a modified construction of the indicating apparatus in which the inlet port of the drum is provided with a removable apertured plug.

Fig. 5 is a vertical cross-sectional view through a portion of a modified casing in which the drum therein is provided with outlet apertures.

As apparent from Figs. 1 and 2, the indicator comprises a casing provided with inlet and outlet tubes 2 and 3, arranged preferably in alinement with one another, which allows an easier mounting of the apparatus in a fluid-pipe.

Inside the casing 1 is arranged, in conformity with one of the chief features of my invention, a drum 4 which is secured to the casing 1 in any suitable manner or, still better, cast therewith. This drum which, in the case illustrated, is concentric with the casing and secured to the bottom thereof, is slightly less high than the side wall of the casing (Fig. 2). The drum 4 is provided with a port 5 allowing communication with the inside of the casing; this port which serves for the entrance of fluid inside the drum is given a very oblique and almost tangential direction and is located in front of the calibrated port 6 at the end of the tube 2 through which the fluid is admitted into the casing. Thus the jet of fluid arrives almost tangentially into the inside of the drum, as well known per se, so as to act on the movable system. The latter is constituted as in all other similar apparatuses by an indicator hand 7 carrying at one end a small blade 8 on which the fluid entering tangentially inside the drum impinges.

This hand is submitted to the action of a spiral spring 9 and the axis of said hand is carried inside the bracket 10.

On the casing is mounted a dial 11 in rear of which the indicating needle 7 is adapted to move. The dial is covered by a glass 12 held in place by a ring 13 which may be screwed inside the outer or upper part of the casing 1.

The fluid which has entered the casing may be let out, for instance, as shown in Fig. 2, through the space provided between the outer or upper edge of the drum 4 and the indicator dial 11, said fluid escaping over the whole periphery of the edge of the drum into the annular space comprised between the drum 4 and the side wall of the casing 1, from which annular space it finally escapes through the tube 3.

If it is desired, the outlet of the fluid from the inside of the drum 4 may be performed in any other manner, for instance as shown in Fig. 5 through apertures 15 provided all around the drum and establishing a communication between the inside of the drum and the annular space formed between the casing 1 and said drum 4. The apertures 15 may be provided at any level, for instance as shown near the inner or lower part of the drum 4.

By changing the relative calibration of the two inlet openings 5 and 6, and also the means for letting the fluid out of the drum (such as the height of the space provided above the upper edge of the drum 4), it is possible to adjust the sensitivity of the apparatus If required, it is possible to adjust said sensitivity after manufacture, for instance as shown in Fig. 4 by introducing inside the port 5, by means of screwing, a plug 16 provided with a calibrated aperture 17; according as to whether a given plug is introduced or replaced by another plug having a differently calibrated aperture, it is possible to modify at will after manufacture the sensitivity of the apertures.

Moreover as, in accordance with the main feature of the invention, only part of the fluid entering the tube 2 acts on the movable system after passing into the drum 4 through the inlet port 5 while the remainder of the fluid entering the casing passes directly out of it through the outlet tube 3, it is possible to mount the above described apparatus in large output pipes without this leading to the use of large-sized indicator apparatuses.

In Fig. 3, I have illustrated on the other hand a modification of the invention, applicable more particularly to large outputs.

As apparent from inspection of said figure, the apparatus again comprises an inner drum 4 inside which is located a movable system. The sole difference from the preceding form of execution resides in that the drum is almost entirely surrounded by the large diameter inlet and outlet tubes 2' and 3'.

It is possible moreover to provide, as shown, a lip or projection 14 in front of the inlet aperture 5 opening into the drum 4, so as to allow the entrance of a somewhat larger amount of fluid into said drum if required.

Of course, the above described arrangements have been given out solely by way of examples of execution of my invention; numerous modifications may be made in the details of execution without the general principle of my invention being altered thereby.

What I claim is:

1. In an indicating device of the character described, a casing having a cylindrical chamber provided with a fluid inlet opening and a fluid outlet opening, a bottom, and a flat transparent cover forming the top wall of said chamber, a cylindrical wall arranged concentrically within said chamber and spaced from the inner wall thereof, said cylindrical wall being secured with its lower end to the bottom of said casing and terminating with its upper end slightly below said flat transparent cover to permit escape of fluid from within said cylinder to said chamber, said cylindrical wall being provided with a fluid inlet port therethrough having a very oblique direction with respect to the circumference of said cylindrical wall, said fluid inlet port being positioned adjacent the point where the fluid enters the cylindrical chamber through said inlet opening, and rotatable indicating means arranged in the space enclosed by said cylindrical wall and actuated by the fluid entering said space through the obliquely directed inlet port in said cylindrical wall.

2. In an indicating device of the character described, a casing having a cylindrical chamber and axially aligned fluid inlet and outlet openings, a bottom, and a flat transparent cover forming the top wall of said chamber, a cylindrical wall arranged concentrically within said chamber and spaced from the inner wall thereof and secured with its lower end to the bottom of said casing, said cylindrical wall terminating with its upper end slightly below said flat transparent cover to permit escape of fluid from within said cylinder to said chamber, said cylindrical wall being provided with a calibrated fluid inlet port therethrough having a substantially tangential direction with respect to the circumference of said cylindrical wall, said fluid inlet port being positioned adjacent the point where the fluid enters the cylindrical chamber through said inlet opening, and rotatable indicating means arranged in the space enclosed by said cylindrical wall and actuated by the fluid entering said space through the substantially tangential inlet port in said cylindrical wall.

3. In an indicating device of the character described, a casing having a cylindrical chamber provided with a fluid inlet opening and a fluid outlet opening, a flat bottom, and a flat transparent cover forming the top wall of said chamber, a cylindrical wall arranged concentrically within said chamber and spaced from the inner wall thereof, said cylindrical wall being secured with its lower end to said flat bottom, terminating with its upper end slightly below said flat transparent cover to permit escape of fluid from within said cylinder to said chamber, said cylindrical wall being provided with a calibrated fluid inlet port therethrough having a very oblique direction with respect to the circumference of said cylindrical wall and being arranged in axial alignment with the inner end of the fluid inlet opening of said casing, said inner end of said last named fluid inlet opening being provided with a calibrated bore, and rotatable indicating means arranged in the space enclosed by said cylindrical wall and actuated by the fluid entering said space through the obliquely directed inlet port in said cylindrical wall.

4. In an indicating device of the character described, a casing having a cylindrical chamber and axially aligned fluid inlet and outlet openings, a flat bottom, and a flat transparent cover forming the top wall of said chamber, a cylindrical wall arranged concentrically within said chamber and spaced from the inner wall thereof, said cylindrical wall being secured with its lower end to said flat bottom, terminating with its upper end slightly below said flat transparent cover to permit escape of fluid from within said cylinder to said chamber, said cylindrical wall being provided with a calibrated fluid inlet port therethrough having a substantially tangential direction with respect to the circumference of said cylindrical wall and being arranged in axial alignment with the inner end of the fluid inlet opening of said casing, said inner end of said last named fluid inlet opening being provided with a calibrated bore, and rotatable indicating means arranged within the space of said cylindrical wall and actuated by the fluid entering said space through the obliquely directed inlet port in said cylindrical wall.

5. In an indicating device of the character described, a casing having a cylindrical chamber provided with a fluid inlet opening and a fluid outlet opening, a bottom, and a flat transparent cover forming the top wall of said chamber, a cylindrical wall arranged concentrically within said chamber and spaced from the inner wall thereof, said cylindrical wall being secured with its lower end to the bottom of said casing and terminating with its upper end slightly below said flat transparent cover to permit escape of fluid from within said cylinder to said chamber, said cylindrical wall being provided with a fluid inlet port therethrough having a very oblique direction with respect to the circumference of said cylindrical wall, said fluid inlet port being positioned adjacent the point where the fluid enters the cylindrical chamber through said inlet opening, an outwardly projecting lip on the outer circumference of said cylindrical wall forming an extension of a portion of the wall of said obliquely directed inlet port for deflecting some of the fluid entering the cylindrical chamber into said inlet port, and rotatable indicating means arranged in the space enclosed by said cylindrical wall and actuated by the fluid entering said space through the obliquely directed inlet port in said cylindrical wall.

6. In an indicating device of the character described, a casing having a cylindrical chamber provided with a fluid inlet opening and a fluid outlet opening, a bottom, and a flat transparent cover forming the top wall of said chamber, a cylindrical wall arranged concentrically within said chamber and spaced from the inner wall thereof, said cylindrical wall being secured with its lower end to the bottom of said casing and terminating with its upper end adjacent said flat transparent cover to permit escape of fluid from within said cylinder to said chamber, said cylindrical wall being provided with a fluid inlet port therethrough having a very oblique direction with respect to the circumference of said cylindrical wall, and with a plurality of fluid discharge apertures, said fluid inlet port being positioned adjacent the point where the fluid enters the cylindrical chamber through said inlet opening, and rotatable indicating means arranged in the space enclosed by said cylindrical wall and actuated by the fluid entering said space through the obliquely directed inlet port in said cylindrical wall.

7. In an indicating device of the character described, a casing having a cylindrical chamber and axially aligned fluid inlet and outlet openings, a bottom, and a flat transparent cover forming the top wall of said chamber, a cylindrical wall arranged concentrically within said chamber and spaced from the inner wall thereof and secured with its lower end to the bottom of said casing, said cylindrical wall terminating with its upper end slightly below said flat transparent cover to permit escape of fluid from within said cylinder to said chamber, said cylindrical wall being provided with a fluid inlet port therethrough having a substantially tangential direction with respect to the circumference of said cylindrical wall, a plug having a calibrated passage therethrough removably mounted in said fluid inlet port, said calibrated passage being in communication with the annular chamber formed in said casing adjacent the point where the fluid enters the same through said inlet opening, and rotatable indicating means arranged in the space enclosed by said cylindrical wall and actuated by the fluid entering said space through said calibrated passage in said plug.

ANDRÉ CHAUMERLIAC.

REFERENCES CITED

The following references are of record in the file of this patent:

UNITED STATES PATENTS

| Number | Name | Date |
|---|---|---|
| 404,374 | Ball | June 4, 1889 |
| 470,033 | Beckmann | Mar. 1, 1892 |
| 864,579 | Volz | Aug. 27, 1907 |
| 1,684,316 | Hamill | Sept. 11, 1928 |
| 1,788,976 | Beraud et al. | Jan. 13, 1931 |
| 2,018,361 | Henszey | Oct. 22, 1935 |
| 2,268,391 | Gauthier | Dec. 30, 1941 |
| 2,296,542 | Steen | Sept. 22, 1942 |
| 2,315,185 | Boyle | Mar. 30, 1943 |

FOREIGN PATENTS

| Number | Country | Date |
|---|---|---|
| 403,236 | France | Sept. 18, 1909 |
| 598,335 | Germany | June 11, 1934 |
| 763,855 | France | Feb. 19, 1934 |